April 8, 1941.  W. H. BRETZLAFF ET AL  2,237,332
AIR CONDITIONING METHOD AND MEANS
Filed April 3, 1937
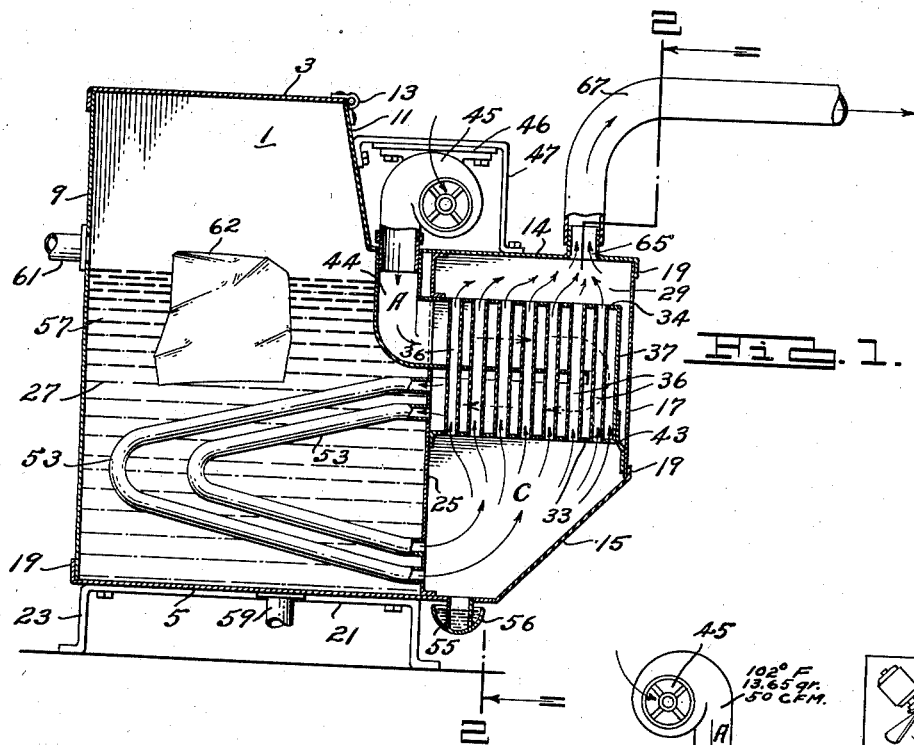
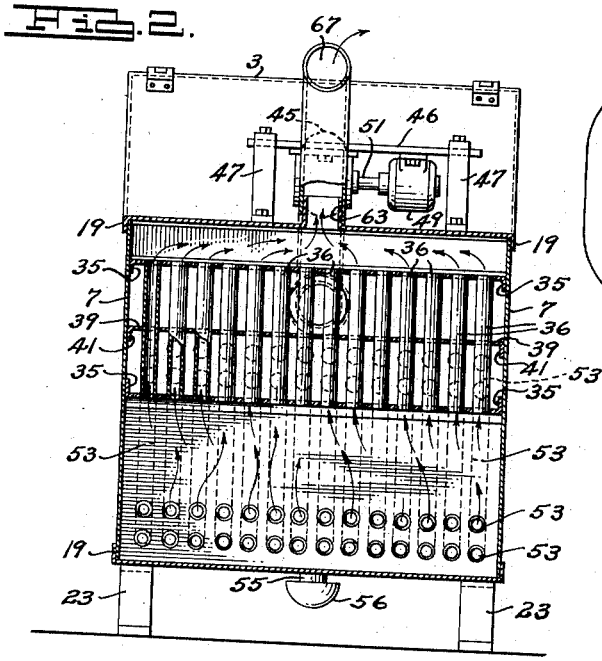
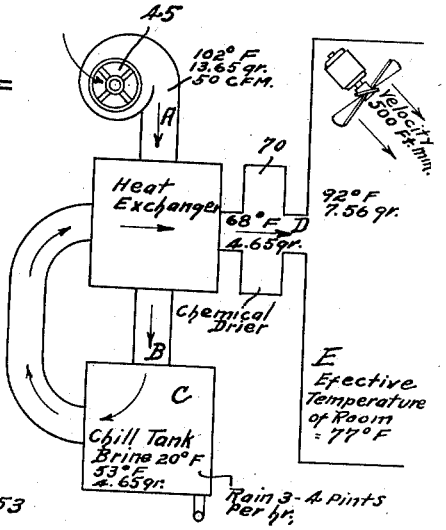
INVENTOR.
Walter H. Bretzlaff
Charles P. Grimes
BY  H. D. Hicks
ATTORNEY.

Patented Apr. 8, 1941

2,237,332

UNITED STATES PATENT OFFICE 2,237,332

AIR CONDITIONING METHOD AND MEANS

Walter H. Bretzlaff, Detroit, Mich., and Charles P. Grimes, Syracuse, N. Y.

Application April 3, 1937, Serial No. 134,718

10 Claims. (Cl. 62—131)

Our invention pertains to an improved method of and apparatus for cooling and dehumidifying air and other gases.

Previously known air conditioning systems have been unsatisfactory especially where the intended purpose was to provide for human comfort. This was because of certain conditions created by the operation of such systems. Cold damp air feels like a cellar and is intolerable to most humans. Cold dry air, blown into a room, produces a local chill in its blast which is of great discomfort to any person exposed to it. Also the apparatus and systems previously used for air conditioning have been so complicated, and so expensive and bulky to install that air conditioning has been unavailable to many people and for many applications.

It is accordingly an object of our invention to provide for cooling the warm humid air in a room for human comfort by introducing into the room a stream or streams of air, which has been dried or partially dried in any convenient manner, to produce a reduction in the wet bulb temperature of their mixture.

It is also an object of our invention to provide efficient apparatus of simplified compact construction for carrying out our improved method of air conditioning.

It is a further object of our invention to provide air conditioning apparatus comprising the combination of means for drying air by successively chilling it below its dew point to precipitate and collect its moisture, and means for thereafter rewarming the air before introducing it into the room. By this arrangement the dried air when introduced into a super-saturated atmosphere acts faster and a positive and snappy absorption of the room vapor into the dry fresh air is obtained, and the cooling effect of the adiabatic absorption is therefore accomplished before the air is vented from the room. Also because the fresh dry air is rewarmed, large volumes thereof can be introduced into a room crowded with people without causing discomfort to the occupants.

Another object of our invention is to provide such an air conditioning system wherein the rewarming of the chilled dried air is accomplished by passing it through a heat exchanger and absorbing heat from the outside air as it is entering the air chiller, whereby the entering air is pre-cooled before it enters the chiller thereby reducing the heat load on the chiller, and in the same operation the cold dried air is warmed and tempered before introducing it into the room for greater comfort.

Another object of our invention is to provide a compact air conditioning unit comprising a housing enclosing an air flow heat-exchanger having a warm air side and a chilled air side disposed for conducting separated streams of air in close thermal coupled relation, a chilled air precipitating chamber adjacent one end of the cold air side of the heat-exchanger for conducting the dehydrated cold air thereto, a chill tank for enclosing a heat absorbing medium, air chilling conduits of high thermal conductivity disposed for receiving air at one end directly from the warm air side of said air heat-exchanger and inclined through the chill tank for connecting into the precipitating chamber at their lower ends, and air circulating means on said housing for drawing in the warm humid air to be conditioned and circulating it in series relation through the warm air side of the air heat-exchanger, the chilling conduits, the chilled air chamber and the cold air side of the heat-exchanger.

A further object of our invention is to provide an air conditioner unit of the above type in which the chilled air moisture precipitating chamber is provided with an inclined wall upon which the chilled air impinges from the chilling conduits for depositing precipitated moisture and a drain having a water seal in the bottom of the chilled air chamber.

The novel features which we consider characteristic of our invention are set forth with particularity in the appended claims. The invention itself, however, both as to its organization and its method of operation, together with additional objects and advantages thereof, will best be understood from the following description of specific embodiments when read in conjunction with the accompanying drawing, in which:

Fig. 1 is a vertical sectional view taken longitudinally through the air conditioner unit;

Fig. 2 is a vertical sectional view taken transversely through the air conditioner unit, as indicated by line 2—2 in Fig. 1; and Fig. 3 is a diagrammatical view representing schematically the cooperative relation of the air conditioning elements.

Referring more specifically to Figs. 1 and 2 of the drawing, we have illustratively disclosed our air conditioner embodied in a compact unitary structure comprising a housing 1 having a top wall 3, a bottom wall 5, and cooperative side walls 7 disposed in spaced relation therebetween. A front wall panel 9 extends from the top wall portion 3 to the bottom wall 5 in abutting relation between the front edges of the spaced side walls 7. The top wall 3 joins a sloping intermediate wall 11 from the upper edge of which the upper portion 3 is pivoted by a hinge 13 to provide convenient access into the housing. From the lower edge of the sloping portion 11, a down-set top wall 14 extends. The rear portion of the bottom wall 5 is inclined upwardly to provide an inclined air baffle and moisture collector 15 for a purpose to be subsequently described.

The spaced side walls 7 of the housing are provided with upper and lower edges of suitable conformation for engaging the edges of the various off-set and sloping portions of the top and bottom walls of the housing. A short back wall panel 17 joins the rear edges of the top and bottom walls. The housing is constructed of any suitable sheet metal of a sufficient gauge to provide the necessary rigidity. The front, back and side walls may be separately joined panels or an integral sheet of metal cut to the proper dimensions and thereafter bent to the proper conformation for joining along the edges of the bottom and top walls in accordance with the usual practice in the arts of sheet metal working and boiler making. The top and bottom walls of the housing are provided along their edges with angularly turned flanges 19 for abutting and securing the edges of the side walls as by welding or riveting. For mounting the air conditioner housing, pedestal brackets 21 comprising feet 23 are suitably spaced thereunder.

Rising from the bottom wall 5, a partition wall 25 extends transversely across the interior of the housing for dividing the enclosed space to provide a chilling tank or chamber 27 and an air flow heat-exchanger chamber 29. For receiving the warm humid air to be dehumidified, a heat-exchanger is provided comprising a horizontal flue sheet 33 provided in spaced parallel relation under a flue sheet 34. By angularly turned flanges 35 on the edges the flue sheets may be conveniently secured between the said walls 7 of the housing.

The flue sheets 33 and 34 are correspondingly apertured to receive a plurality of small flues 36. The flues 36 are preferably small copper tubes of about ¼ inch outside diameter, the ends of which are secured into the apertures in the flue sheets, as by expanding and/or soldering. A baffle plate 39 passes transversely through an intermediate portion of the heat-exchanger from the partition wall 25 to spaced relation from a side plate 37 which joins the backwardly projected edges of the flue-sheets. The baffle plate 39 is provided with side flanges 41 for attachment to the side walls 7 of the housing, and it is apertured suitably for passing the flues 36, which are not necessarily joined thereto. As will be understood the flue sheets 33 and 35 may with plate 37 comprise a unitary piece of sheet metal.

The space between the side plate 37 of the heat-exchanger and the back wall 17 of the housing is sealed by means of an inclined flexible apron 43 which is secured or welded along its upper edge to the heat-exchanger and along its lower edge to the housing wall.

The partition wall 25 is suitably apertured to receive the lower end of an air inlet elbow 44, which is secured and sealed therein as by soldering or welding. The other end of the elbow 44 turns upwardly for connection through an inlet aperture in the top wall 14 of the housing. Air circulating means comprising a centrifugal type of air impeller or fan 45, is supported above the top wall 14 of the air conditioner by suspension from the under side of a shelf 46 which extends transversely between a pair of brackets 47 secured between the sloping top wall 11 and the down-set top wall portion 14. An electric motor 49 is also supported from the under side of the shelf 46 for driving the fan 45 through a directly connected shaft 51.

In operation the fan 45 draws the warm humid air, which is to be conditioned, and forces it downwardly through the conduit 44 and around the flues 36 above the baffle 39 in the heat-exchanger, as indicated by the dotted arrows. Flowing down at the back in the heat exchanger the air passes down between the wall 37 and the back edge of the baffle 39, passing thereunder toward the front of the housing, as indicated, thus completing the traverse of the warm air side of the air flow heat-exchanger.

Air chilling conduits 53, which are preferably tubes of copper, are connected at one end from the warm air side of the heat-exchanger. For this purpose the partition wall 25 is suitably apertured between the baffle 39 and the lower flue sheet 33 and the ends of the chilling conduits 53 are secured therein to receive the air from the lower portion of the warm air side of the heat-exchanger. The air chilling conduits extend for immersion in any heat absorbing medium in the chilling tank 27 and they are disposed in downwardly inclined positions for connection through suitable apertures in the lower portion of the partition 25 into the air moisture precipitating chamber C under the heat-exchanger. The air passing through the chilling pipes 53 is dehydrated by cooling it away below its initial dew point or saturation temperature. As the air flows along in the chilling pipes it is successively chilled below its successively lowered dew points. Moisture condensing in the chilling tubes 53 is carried down by the flow of the air therethrough and deposited in the precipitating chamber C which operation is facilitated by the downward slope of the tubes. Also as the air is blown from the ends of the tubes it impinges against the inclined rear wall 15 where moisture is precipitated on the inclined surface and runs down to the bottom of the chamber. Moisture collecting at the bottom of the chamber C is discharged through a drain 55 therein comprising a water seal 56 in series relation for maintaining the air circulating pressure in the precipitating chamber.

For a heat absorbing medium 57, in the chill tank or chamber 27, any convenient agency may be used such as cold flowing spring water which may be received through a pipe fitting 59 suitably provided in the bottom of the tank, and discharged through a discharge outlet 61 provided at a suitable level in the front wall 9 of the tank. If cold water is not available at suitable temperatures, the tank may be chilled by charging it with ice, represented at 62, through the hinged top cover 3. If mechanical refrigeration is preferred, the tank may be filled with any suitable brine or eutectic solution cooled by a volatile refrigerant evaporator immersed therein in a well known manner. The compact air conditioner is thus readily adaptable for utilizing the most economical heat absorbing medium available in any location.

From the precipitating chamber C the cold dry air passes upwardly into and through the vertical flues 36 in close thermally coupled relation with the inner surfaces thereof. This comprises the chilled air side of the heat-exchanger. In this phase of the process the chilled air is rewarmed by the heat absorbed from the incoming air which is passing through the warm air side of the heat-exchanger. The dried air is thus tempered before it is delivered into the room to be conditioned. Also this operation precools the incoming air and diminishes the heat load on the chill tank.

The dried air, which has been thus rewarmed, then passes into the space in the housing above the heat-exchanger continuing through an outlet vent 63, comprising a collar 65, and thence into a dry air delivery conduit 67 which is fitted thereon. The dry air delivery pipe 67 discharges the rewarmed dried air into a room 69, as represented in Fig. 3. A chemical drier 70, of any well known construction, may be connected in series relation for use in combination in our system if desired.

In the room 69, which is to be conditioned, the tempered dry air introduced is intermingled with the warm humid air. This operation is stimulated by means of a fan 71 of which a plurality are suitably positioned for thoroughly mixing the air into every nook and cranny of the room. This lowers the temperature of the air in the room by adiabatic absorption of the moisture therein. The rewarmed dry air thus introduced is practically unnoticed even close to the incoming duct and can not be felt a few feet away.

The mechanical mixing of this dry rewarmed air with the humid warm air of the room greatly aids it to absorb many grains of moisture per cubic foot and to produce approximately 8½° F. of chill for each grain of moisture absorbed by each cubic foot of dry air, regardless of how much this dry air has been mixed and diffused about the room.

In each room conditioned by our system a quantity of air must be vented from the room equal to the volume of dry tempered air which is introduced. This may be accommodated through special outlet vents, as will be readily understood, or in some installations the leakage around doors and windows may be sufficient. In small rooms and enclosures two changes of air per minute are needed to care for smokers and this rate of air flow is readily obtained by our system without discomfort to the occupants because the dry chilled air has been rewarmed before being introduced.

With the rapid rate of air flow into and out of the room it is important that the fresh dry air absorb the water vapor from the room air very rapidly. In our system this is very quickly accomplished because of the rewarmed and tempered condition of the dry air at the time when it is introduced into the room.

While operating to cool the air in a room, our system tends also to continuously dehumidify the same. This is particularly useful where a large number of people are congregated and eliminates the damp uncomfortable condition which is so often produced by the prior air conditioning systems.

By way of example the following conditions were obtained by one particular operation of our system and the figures pertaining thereto are given merely by way of example, and they are not to be considered as limiting the degree or scope of our invention. The temperature of the air in the room was initially at 102° F. and by mixing therein rewarmed dry air from our apparatus at a temperature of 68° F., an effective temperature of 77° F. was obtained. In this operation, the air entering at A, as represented in Fig. 3, was outside air drawn in at a temperature of 102° F. and 13.65 grains of water vapor per cubic foot, and at about 50 cubic feet per minute. Passing through the chill tank where the brine was at 20° F., the air was chilled and it entered the precipitation chamber C at a temperature of 53° F. where most of its moisture was rained out to 4.65 grains per cubic foot. Passing up through the heat-exchanger the air was reheated to 68° F., and it was then mixed with the warm humid air in the room where the temperature was reduced to 92° F. and humidity to 7.56 grains.

Aside from the specific embodiments of the invention herein shown and described, and the method described and set forth, it is understood that numerous modifications thereof come within the spirit and scope of our invention as disclosed and claimed.

We claim:

1. A compact air conditioning unit comprising, an enclosing housing, a partition wall dividing said housing into a chill tank and a heat-exchanger compartment, an air flow heat-exchanger in said compartment having a warm air side and a chilled air side separated by heat absorbing and emitting surfaces for conducting separated air streams in close thermally coupled relation, air chilling conduits disposed for receiving air at one end directly from the warm air side of said heat-exchanger, said air chilling conduits being disposed in downwardly inclined relation through the chill tank for connecting into a precipitation chamber at their lower ends, and air circulating means mounted on said housing for drawing in warm humid air to be conditioned and forcing it in series relation through the warm air side of the heat-exchanger, the chilling conduit in the chill tank, the precipitation chamber, and the cold air side of the said heat-exchanger.

2. A compact air conditioning unit comprising the structure set forth in claim 1 wherein the air heat-exchanger comprises a plurality of small air conducting flues connected between a pair of flue sheets, said air heat-exchanger being positioned in the upper portion of said heat-exchanger compartment to provide a precipitation chamber in the lower portion of said compartment, and an inclined baffle surface in said precipitation chamber for impinging the chilled air thereon as it enters for collecting the moisture.

3. A compact air conditioning unit as set forth in claim 1, wherein the air chilling conduits comprise a plurality of tubes connected at their upper ends from the lower portion of the warm air side of said heat-exchanger and passing through said chill tank for connection at their other ends through said partition for projecting chilled air into the lower portion of compartment comprising the precipitating chamber, and said conduits being suitably inclined so that gravity will aid the aid flowing therein to carry the precipitate to the precipitating chamber.

4. A compact air conditioning unit comprising, an enclosing housing, a partition wall dividing said housing into a heat-exchanger compartment and a chill tank for receiving and holding a heat absorbing medium, an air flow heat-exchanger in the upper part of said heat-exchanger compartment with one air receiving side conductively connected thereto, air chilling conduits disposed for receiving air at one end directly from the other side of said heat-exchanger, said air chilling conduits extending in downwardly inclined positions through said chill tank and connecting at their lower ends through said partition wall into the lower part of said heat-exchanger chamber for collecting precipitated moisture therein, and conduit means for receiving into said heat-exchanger the air to be conditioned.

5. An air conditioning system comprising, a chill tank for enclosing a heat absorbing medium, conduit means associated therewith for passing air in close thermal coupled relation with the heat absorbing medium, an air heat-exchanger having heat absorbing and emitting surfaces comprising a warm air side and a separated cold air side, a precipitating chamber interposed between the chill tank and the cold air side of said heat-exchanger for receiving the chilled air from the chill tank and collecting the condensed moisture therein, a drain in the lower portion of said precipitation chamber, a water seal in said drain for maintaining the air circulating pressure in the circuit, conduit means comprising an air flowing circuit for passing air in series relation through the warm air side of said heat-exchanger, the chill tank, the precipitating chamber and the cold air side of said heat-exchanger, conduit means for delivering the dry air from the cold air side of said heat-exchanger into a room to be conditioned, and air circulating means for intermingling the air in said room.

6. An air conditioning system comprising, an enclosure to be air conditioned for human comfort, air circulating means, a chill chamber associated therewith for containing a heat absorbing medium, conduit means associated therewith for passing air in close thermal coupled relation with the heat absorbing medium, moisture separating baffle means, an air-to-air heat exchanger having heat absorbing and emitting surfaces comprising a warm air side thermally connected to a separate cold air side, conduit means comprising an air flowing circuit for passing air in series relation from a source of fresh air located without the enclosure to be air-conditioned, through the warm air side of said heat exchanger to be pre-cooled, through said chill chamber to be further cooled to rain out moisture, passing said baffle means for further removal of entrained moisture, thence through the cold air side of said heat exchanger where the then cold, dry air is tempered as it passes in counter-flow to pre-cool fresh entry air, thence through conduit means into said enclosure to be air conditioned where it becomes mixed with the room air as it is forcibly circulated to reduce the average moisture content, the total heat content of the mixture, the wet bulb thermometer reading, and the effective temperature of the room, before passing out of the room and venting to atmosphere.

7. An air conditioning system for treating or conditioning air for human comfort in an enclosure comprising, apparatus for cooling and dehydrating air, said apparatus having an air inlet for receiving fresh outside air to be conditioned and an air outlet for delivering the treated air to the enclosure to be conditioned, an air-to-air heat exchanger having a cold air side and a warm air side thermally connected to the cold air side but with separate passages for conducting air therethrough, air moving means for circulating the air therethrough, conduit means for connecting the warm air side of said heat exchanger to pass the fresh air to said apparatus and the cold air side to pass the conditioned air in counterflow relation from the apparatus to an enclosure to provide for the entry air to be precooled by passing through said heat exchanger and the conditioned and dehydrated air to be tempered prior to being discharged in the enclosure, and means for intermingling and projecting such air on occupants for human comfort.

8. Air conditioning apparatus for providing for human comfort in an enclosed space comprising, air circulating means, a chill chamber associated therewith enclosing suitable heat absorbing medium, conduit means associated therewith for passing air thereto to be chilled by said heat absorbing medium, a precipitation chamber connected thereto to receive the chilled air therefrom, baffle means in said precipitating chamber for removal and collection of entrained moisture in said air, a suitably sealed drain in said precipitating chamber to provide disposition of such moisture and to insure against air leakage therethru, an air-to-air heat exchanger having a warm air side and a chilled air side separated by heat absorbing and emitting surfaces for conducting separated airstreams in close thermally coupled relation, conduit means comprising an air flowing circuit for passing air in series relation through the warm air side of said heat exchanger, the chill chamber, the precipitating chamber, the cold air side of said heat exchanger, and on into an enclosure to be conditioned, and air circulating means for intermingling and projecting such chilled dry air with the room air to impinge on occupants for human comfort.

9. A compact air conditioning unit comprising, an enclosing housing, a partition wall dividing said housing into a chill chamber and a heat-exchanger compartment, an air flow heat-exchanger in said compartment having a warm air side and a chilled air side separated by heat absorbing and emitting surfaces for conducting separated air streams in close thermally coupled relation, means for conducting air directly from the warm air side of said heat-exchanger into said chill chamber for intimate heat exchanging relation with a chilling medium therein and air circulating means mounted on said housing for drawing in warm humid air to be conditioned and forcing it in series relation through the warm air side of the heat-exchanger, the chill chamber, the precipitation chamber, and the cold air side of the said heat-exchanger.

10. The method of treating the air in an enclosure to promote human comfort by aiding bodies of human occupants to react to atmospheric conditions created therein which consists in, introducing fresh outside air through an air-to-air heat exchanger to pre-cool, further cooling the air to below its dew point, removing entrained moisture therefrom, passing this cold dried air in counter-flow relation through the heat exchanger to pre-cool entry air, while simultaneously tempering the cold dried air, forcibly circulating this tempered dry air into enclosure causing it to intermingle with humid room air and contacting occupants to produce adiabatic cooling of such occupants in direct proportion to the skin moisture absorbed by this mixture for producing the sensation of comfort cooling to such occupants, venting the enclosure to atmosphere.

WALTER H. BRETZLAFF.
CHARLES P. GRIMES.